US012655371B2

(12) United States Patent
Brandt Sanz et al.

(10) Patent No.: US 12,655,371 B2
(45) Date of Patent: Jun. 16, 2026

(54) PROCESS OF SEALING POLYVINYLALCOHOL FILMS

(71) Applicant: The Procter & Gamble Company, Cincinnati, OH (US)

(72) Inventors: Miguel Brandt Sanz, Tervuren (BE); Andrea Gabriele, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 825 days.

(21) Appl. No.: 17/957,354

(22) Filed: Sep. 30, 2022

(65) Prior Publication Data

US 2023/0109121 A1 Apr. 6, 2023

(30) Foreign Application Priority Data

Oct. 1, 2021 (EP) ..................................... 21200604
Jun. 15, 2022 (EP) ..................................... 22179116

(51) Int. Cl.
| | |
|---|---|
| *C11D 17/04* | (2006.01) |
| *B05D 1/02* | (2006.01) |
| *B05D 5/10* | (2006.01) |
| *B29C 65/00* | (2006.01) |
| *B29C 65/48* | (2006.01) |
| *B65B 9/04* | (2006.01) |
| *B65B 51/02* | (2006.01) |

(52) U.S. Cl.
CPC .............. *C11D 17/043* (2013.01); *B05D 1/02* (2013.01); *B05D 5/10* (2013.01); *B29C 65/4895* (2013.01); *B29C 66/73793* (2013.01); *B65B 51/023* (2013.01); *B65B 9/042* (2013.01)

(58) Field of Classification Search
None
See application file for complete search history.

(56) References Cited

U.S. PATENT DOCUMENTS

| | | | | |
|---|---|---|---|---|
| 9,944,771 | B2 * | 4/2018 | Lucas | ...................... C08K 5/17 |
| 12,286,514 | B2 * | 4/2025 | Okamoto | .................. C08J 5/18 |
| 2007/0079454 | A1 * | 4/2007 | Duffield | ................. B29C 66/43 |
| | | | | 8/526 |
| 2014/0345064 | A1 | 11/2014 | Koch et al. | |
| 2015/0266638 | A1 | 9/2015 | Kumar et al. | |
| 2017/0067003 | A1 | 3/2017 | Souter et al. | |
| 2017/0087591 | A1 * | 3/2017 | Decher | .................. B05D 5/00 |
| 2017/0226449 | A1 * | 8/2017 | Keuleers | ............... B65D 65/46 |
| 2017/0298216 | A1 * | 10/2017 | Labeque | .................. C08J 5/18 |
| 2018/0002647 | A1 | 1/2018 | Souter | |

(Continued)

FOREIGN PATENT DOCUMENTS

| | | |
|---|---|---|
| EP | 1641865 A1 | 4/2006 |
| GB | 991465 A | 5/1965 |

(Continued)

OTHER PUBLICATIONS

Extended EP Search Report and Search Opinion for 21200604.3 dated Mar. 24, 2022, 12 pages.

(Continued)

*Primary Examiner* — Michael N Orlando
*Assistant Examiner* — Abhishek A Patwardhan
(74) *Attorney, Agent, or Firm* — Abigail O. Idokogi

(57) ABSTRACT

A process for sealing a first water-soluble polyvinylalcohol film to a second water-soluble polyvinylalcohol film.

18 Claims, 3 Drawing Sheets

(56) References Cited

U.S. PATENT DOCUMENTS

2018/0134431 A1    5/2018  Thienst et al.
2019/0316066 A1*  10/2019  Ellson ................. C11D 17/043
2020/0199344 A1    6/2020  Labeque et al.
2020/0308515 A1  10/2020  Vitiello et al.

FOREIGN PATENT DOCUMENTS

JP       2019119877 A    7/2019
WO     0185898 A1   11/2001

OTHER PUBLICATIONS

Extended EP Search Report and Search Opinion for 22179116.3 dated Jan. 16, 2023, 12 pages.

* cited by examiner

PROCESS OF SEALING POLYVINYLALCOHOL FILMS

FIELD OF THE INVENTION

The present disclosure relates to a process for sealing a first water-soluble polyvinylalcohol film to a second water-soluble polyvinylalcohol film.

BACKGROUND OF THE INVENTION

Water-soluble unit dose articles comprising detergent compositions are liked by consumers as being convenient and efficient to use. Such water-soluble unit dose articles comprise water-soluble films, preferably made of polyvinyl alcohol. Without wishing to be bound by theory, upon addition to water the water-soluble film dissolves or disintegrates releasing the detergent composition into the wash liquor.

Such water-soluble unit dose articles comprise at least a first water-soluble film and a second water-soluble film. The first and second water-soluble films are sealed together to create an internal compartment comprising the detergent composition. The films may be sealed together via solvent sealing in which the solvent may be applied via a spray to at least a part of the first water-soluble film. At least a part of the second water-soluble film is then contacted to at least a part of the area of the first water-soluble film comprising the solvent which was applied via spray.

EP1641865B and US20180134431A1 teach apparatus and processes for sealing water-soluble films together comprising a step of spraying a solvent composition onto at least one of the films and then contacting the films together.

However, an issue with these known processes is that premature seal failure can occur. Such seal failure can result in premature rupture of the unit dose article ahead of use. Therefore, there is a need in the art for a process for sealing together water-soluble polyvinylalcohol films in which seal strength via spray sealing is improved.

EP16141865B teaches small droplet sizes for the sealing solution. Without wishing to be bound by theory, it is believed that carefully controlling the solvent sealing droplet size improves efficiency of droplet deposition on the water-soluble film and so improves seal strength. It is believed that smaller droplet sizes can result in a smaller proportion of the sealing solution reaching the water-soluble film due to a lower degree of inertia, which allows the droplets to be more easily deflected leading to reduced seal strength and also contamination of the surrounding environment. In addition, the smaller droplets, due to higher surface to volume ratio, will dry more quickly both in flight while travelling to the surface and on the surface of the water-soluble film meaning less time to establish a strong seal between the two water-soluble films.

To compensate for this using smaller droplets, a greater volume of sealing solution would need to be sprayed resulting in reduced line speed.

SUMMARY OF THE INVENTION

The present disclosure relates to a process for sealing a first water-soluble polyvinylalcohol film to a second water-soluble polyvinylalcohol film, wherein the first water-soluble polyvinylalcohol film has a first side and a second side, and wherein the second water-soluble polyvinylalcohol film has a first side and a second side, wherein the process comprises the steps of;

a. applying a liquid solvent sealing composition onto at least a part of the first side of the first water-soluble polyvinylalcohol film;

b. Contacting at least a part of the first side of the second water-soluble polyvinylalcohol film with a part of the first side of the first water-soluble polyvinylalcohol film which was sprayed with the liquid solvent sealing composition;

wherein, the liquid solvent sealing composition is applied as a spray from a nozzle, wherein the nozzle comprises an outlet orifice and wherein the liquid solvent sealing composition is ejected from the outlet orifice; and wherein the spray has an average droplet size d50 of between 50 micron and 200 micron before it contacts the first side of the first water-soluble polyvinylalcohol film, wherein the average droplet size d50 is measured via optical imaging of spray droplets after being sprayed from the nozzle, wherein the spray droplets being measured are at a distance of 100 mm perpendicular to the outlet orifice, and wherein the nozzle is orientated such that the spray exits the outlet orifice vertically and the image is captured perpendicular to the direction of movement of the droplets once they exit the outlet orifice.

DETAILED DESCRIPTION OF THE INVENTION

Figure 1:
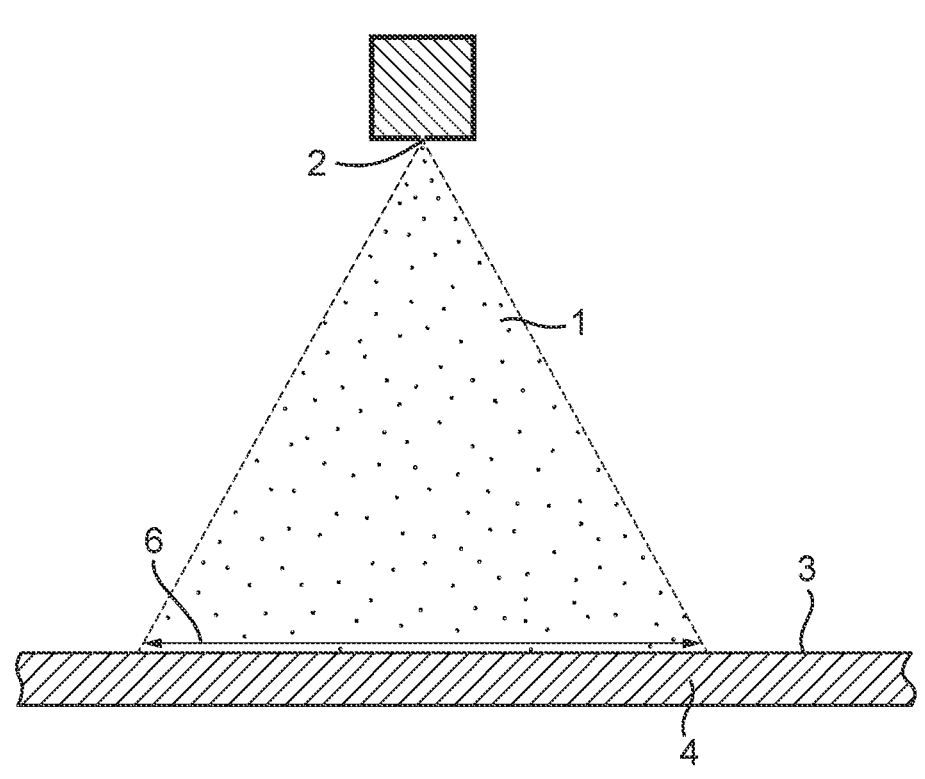
FIG. 1. depicts a spray being sprayed from an outlet orifice onto the first side of a first polyvinylalcohol film as according to the present invention.

The process of the present disclosure provides improved deposition efficacy as such leading to improved seal strength, combined with decreased contamination of the environment, less use of sealing solution and faster line speeds as compared to prior art solutions. It was surprisingly found that the process according to the present invention provided a process having improved seal strength via spray sealing.

Process

The present invention is to a process for sealing a first water-soluble polyvinylalcohol film to a second water-soluble polyvinylalcohol film. The water-soluble films are described in more detail below.

The first water-soluble polyvinylalcohol film has a first side and a second side, and the second water-soluble polyvinylalcohol film has a first side and a second side The process comprises the step of;

a. applying a liquid solvent sealing composition onto at least a part of the first side of the first water-soluble polyvinylalcohol film.

The liquid solvent sealing composition is applied as a spray from a nozzle. The nozzle is described in more detail below. The nozzle comprises an outlet orifice and the liquid solvent sealing composition is ejected from the outlet orifice. When ejected, the spray has an average droplet size d50 of between 50 micron and 200 micron, preferably between 50 micron and 150 micron, more preferably between 70 micron and 130 micron, even more preferably between 90 micron and 110 micron before it contacts the first side of the first water-soluble polyvinylalcohol film.

The average droplet size d50 is measured via optical imaging of spray droplets after being sprayed from the nozzle. The spray droplets that are measured are at a distance of 100 mm perpendicular to the outlet orifice. The nozzle is orientated such that the spray exits the outlet orifice vertically and the image is captured perpendicular to the direction of movement of the droplets once they exit the outlet orifice.

Droplet sizes can be measured using optical high speed imaging. Measurements can be done with VisiSize P15 from Oxford Lasers. A preferred droplet size test method is described below.

In one aspect, at least 50% preferably at least 70% or even more preferably at least 90% of the droplets have a droplet size between 50 microns and 200 microns, preferably between 50 micron and 150 micron, more preferably between 70 micron and 130 micron, even more preferably between 90 micron and 110 micron. Droplet sizes can be measured using optical high speed imaging. Measurements can be done with VisiSize P15 from Oxford Lasers. A preferred droplet size test method is described below.

The shortest distance from the outlet orifice to the first side of the first water-soluble polyvinylalcohol film may be between 40 mm and 160 mm, preferably between 60 mm and 120 mm, more preferably between 70 mm and 90 mm. The liquid solvent sealing composition may be ejected from the outlet orifice at a pressure between 200 kPa to 1000 kPa, preferably between 400 kPa and 800 kPa.

As illustrated in FIG. 1., when the spray (1) is sprayed from the outlet orifice (2) onto the first side (3) of the first polyvinylalcohol film (4), the spray (1) has a spray angle (6) wherein the spray angle (6) is between 80 degrees and 130 degrees, preferably between 90 degrees and 120 degrees.

Figure 6:
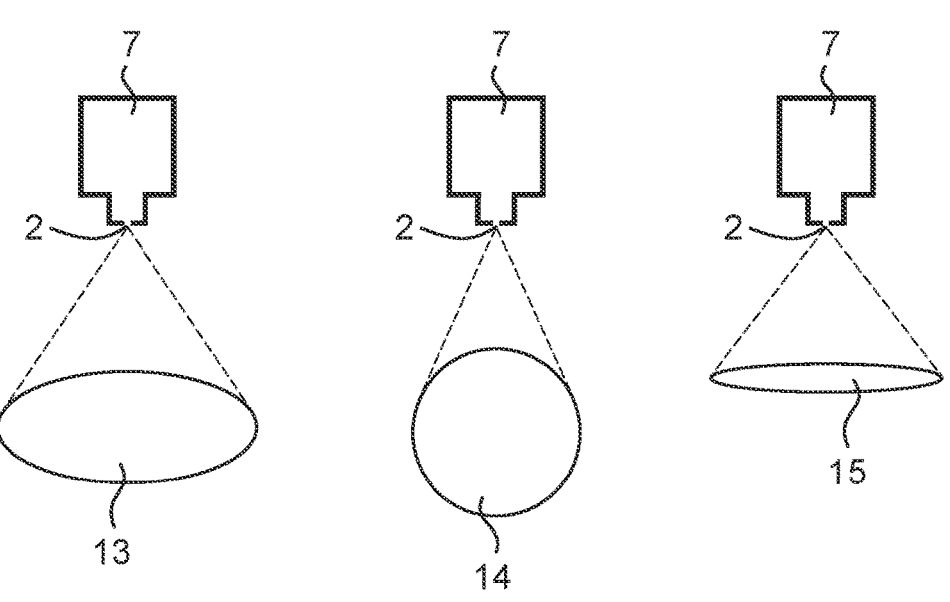
FIG. 6. depicts different spray cones according to the present invention.

The spray may have a cone shape, preferably the cone shape is selected from elliptical cone, round cone, flat cone, or a mixture thereof, preferably a flat cone. FIG. 6. depicts examples of elliptical (13), round (14) and flat (15) cone shapes when sprayed from an outlet orifice (2) of a nozzle (7). Those skilled in the art will be familiar with such shapes and spray patterns and will readily understand the terminology used.

Without wishing to be bound by theory, when referring to a non-circular cross section cone shape, the cone angle should be understood as the angle defined by the largest dimension in the cross-section.

The liquid solvent sealing composition may be applied as a spray from a plurality of nozzles. For example, in a manufacturing process in which it is desired to seal a first polyvinyl alcohol film to a second polyvinyl alcohol film in several places. The plurality of nozzles may comprise at least 2, or even at least 3, or even at least 4, or even at least 5, or even at least 6 nozzles, and each nozzle comprises an outlet orifice and the liquid composition is ejected from each outlet orifice. The spray from each nozzle outlet independently has an average droplet size d50 of between 50 micron and 200 micron, preferably between 50 micron and 150 micron, more preferably between 70 micron and 130 micron, even more preferably between 90 micron and 110 micron before it contacts the first side of the first water-soluble polyvinylalcohol film. Preferably, independently at least 50% preferably at least 70% or even more preferably at least 90% of the droplets from each nozzle have a droplet size between 50 microns and 200 microns, preferably between 50 micron and 150 micron, more preferably between 70 micron and 130 micron, even more preferably between 90 micron and 110 micron, wherein the average droplet size d50 and the droplet size distribution is measured via optical imaging of spray droplets after being sprayed from the nozzle, wherein the spray droplets being measured are at a distance of 100 mm perpendicular to the outlet orifice, and wherein the nozzle is orientated such that the spray exits the outlet orifice vertically and the image is captured perpendicular to the direction of movement of the droplets once they exit the outlet orifice.

The liquid solvent sealing composition from each nozzle independently may contact a different part of the first side of the first water-soluble polyvinylalcohol film. Alternatively, at least a part of one liquid sealing composition from one nozzle may overlap with the liquid sealing composition from a second nozzle.

Preferably, the first polyvinylalcohol film moves in a machine direction and the plurality of nozzles are arranged side-by-side to one another in a cross-machine direction. Without wishing to be bound by theory, cross-machine direction is perpendicular to the machine direction.

Preferably, each nozzle independently has a spray angle and wherein when, independently, the spray from each nozzle is sprayed onto the first side of the first polyvinylalcohol film, the spray angle has a spray angle of between 80 degrees and 130 degrees, preferably between 90 degrees and 120 degrees and preferably the distance between the centre point of the outlet orifice of a nozzle to the centre point of the outlet orifice of an adjacent nozzle is between 130 mm and 250 mm, preferably 150 mm and 190 mm.

Figure 2:
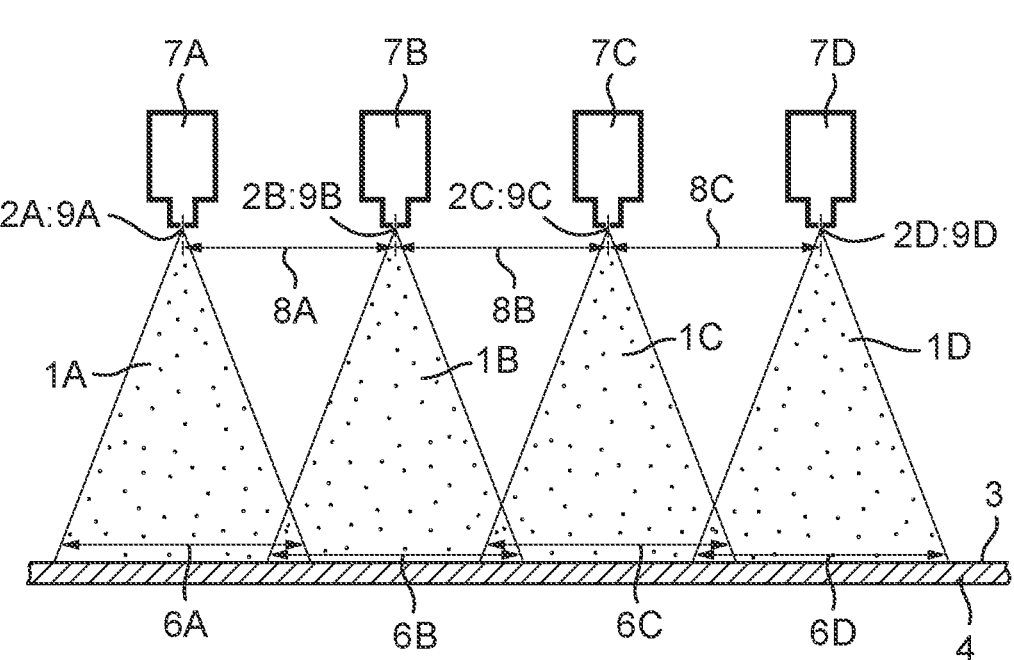
FIG. 2. discloses a plurality of nozzles each comprising an outlet orifice as according to the present invention.

FIG. 2. discloses a plurality of nozzles (7A, 7B, 7C, 7D), each comprising an outlet orifice (2A, 2B, 2C, 2D). Each nozzle (7A, 7B, 7C, 7D) is spraying a spray (1A, 1B, 1C, 1D) onto the first side (3) of the first polyvinylalcohol film (4). Each spray (1A, 1B, 1C, 1D) has a spray angle (6A, 6B, 6C, 6D). Each outlet orifice (2A, 2B, 2C, 2D) has a centre point (9A, 9B, 9C, 9D) and the distance (8A, 8B, 8C) between each centre point (9A, 9B, 9C, 9D) of adjacent outlet orifices (2A, 2B, 2C, 2D) is between 130 mm and 250 mm, preferably 150 mm and 190 mm. Spray 1A overlaps in part with spray 1B. Spray 1B also overlaps in part with spray 1C. Spray 1C overlaps in part with spray 1D. Without wishing to be bound theory, such overlap ensures maximal overall spray coverage.

Figure 3:
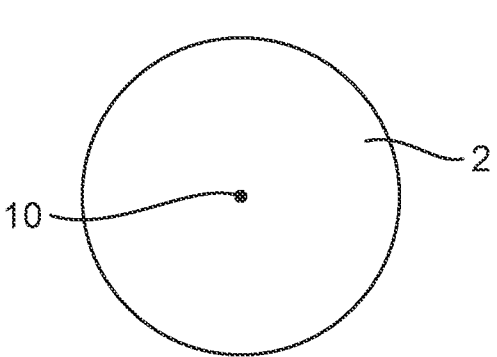
FIG. 3 depicts the centre point of an orifice outlet.

FIG. 3 depicts the centre point (10) of an orifice outlet (2).

Figure 4:
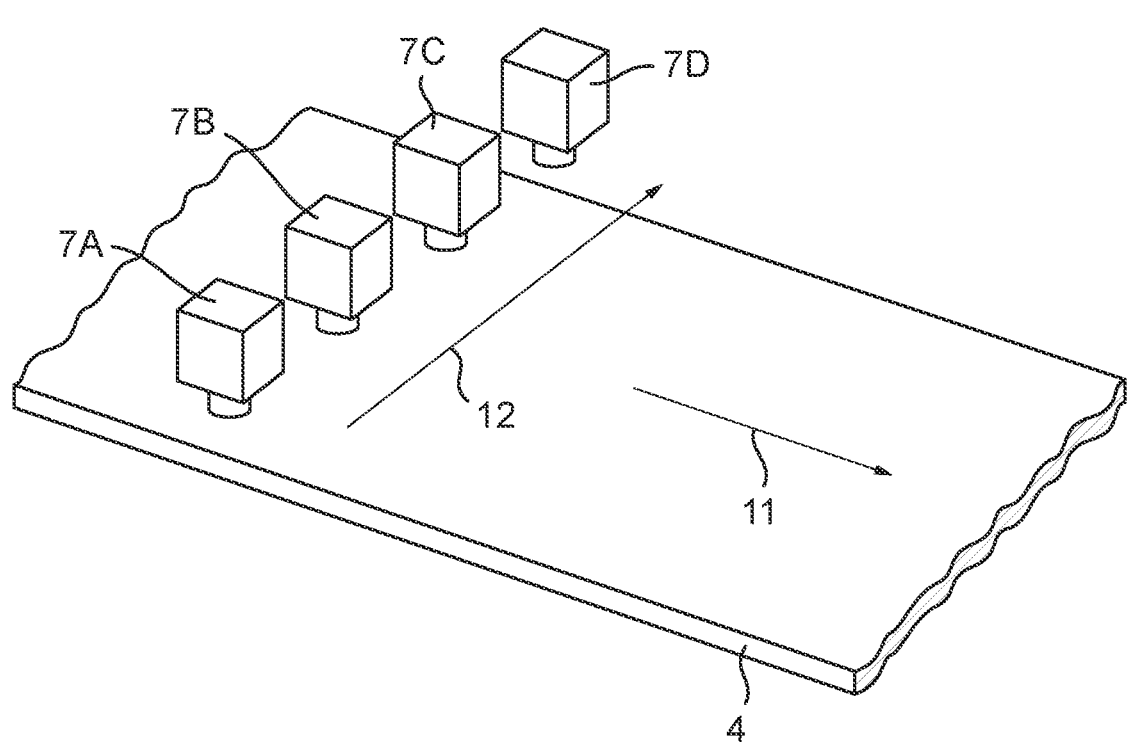
FIG. 4. depicts the first polyvinylalcohol film moving in a machine direction and the plurality of nozzles arranged side-by-side to one another in a cross-machine direction as according to the present invention.

As shown in FIG. 4. the first polyvinylalcohol film (4) may move in a machine direction (11) and the plurality of nozzles (7A, 7B, 7C, 7D) may be arranged side-by-side to one another in a cross-machine direction (12).

The liquid sealing solvent composition may be ejected from the plurality of nozzles simultaneously, or non-simultaneously, preferably simultaneously.

Preferably, wherein the process comprises multiple nozzles, the multiple nozzles are preferably arranged in a cross-machine direction. Without wishing to be bound by theory, the machine direction is the direction in which the first polyvinylalcohol film moves in. The cross-machine direction is the direction perpendicular to the machine direction. By 'perpendicular', we herein mean between 80° and 100°, preferably between 85° and 95°, more preferably 90°. The nozzles may be arranged in a straight line in a cross-machine direction or may be arranged in a staggered arrangement in a cross-machine direction.

Preferably, the first side of the first water-soluble polyvinyl alcohol film is coated with the liquid solvent sealing composition at a rate of between 10 g/m² and 40 g/m², preferably between 15 g/m² and 35 g/m².

Without wishing to be bound by theory, the coating of the liquid solvent sealing composition is measured as an "average coat weight". Typically, this is an estimate of the amount of liquid applied/total area, where the area is the width of the spray angle×distance travelled by the substrate (film) in a given amount of time.

The liquid composition may be ejected from the outlet orifice continually, or intermittently, preferably intermittently. Wherein the process comprises multiple nozzles, each outlet orifice of each nozzle may independently eject the liquid composition continually, or intermittently, preferably intermittently.

Preferably, the liquid composition is ejected from the outlet orifice intermittently and the first polyvinylalcohol film is continuously moving in a machine direction and wherein the first polyvinylalcohol film moves a distance of between 0.5 mm and 10 mm, preferably between 1 mm and 5 mm between each intermittent spray. Wherein the process comprises multiple nozzles, preferably the liquid composition is ejected from each nozzle outlet orifice intermittently and the first polyvinylalcohol film is continuously moving in a machine direction and wherein the first polyvinylalcohol film moves a distance of between 0.5 mm and 10 mm, preferably between 1 mm and 5 mm between each intermittent spray. Preferably, the intermittent sprays from each outlet orifice are simultaneous.

The process comprises a step;
  b. Contacting at least a part of the first side of the second water-soluble polyvinylalcohol film with a part of the first side of the first water-soluble polyvinylalcohol film which was sprayed with the liquid solvent sealing composition.

Without wishing to be bound by theory, the entire area of the first side of the first water-soluble film that was sprayed with the liquid solvent sealing composition may be contacted to at least a part of the first side of the second polyvinylalcohol film. Alternatively, a part of the area of the first side of the first water-soluble film that was sprayed with the liquid solvent sealing composition may be contacted to at least a part of the first side of the second polyvinylalcohol film.

When contacting the first side of the first polyvinylalcohol film and the first side of the second polyvinylalcohol film, pressure may be applied. Alternatively, heat may be applied. Alternatively, pressure and heat may be applied.

Preferably, prior to contacting the second polyvinylalcohol film with the first polyvinylalcohol film, the second polyvinylalcohol film is first deformed into an open cavity. This may be achieved, for example, via thermoforming, vacuum forming, or a combination thereof. Preferably, the open cavity is then filled with a detergent composition. The detergent composition is described in more detail below. At least part of the second polyvinylalcohol film is then contacted with at least part of the first side of the first water-soluble polyvinylalcohol film where the spraying solution has been applied on.

The second polyvinylalcohol film may be deformed to create a single open cavity. Alternatively, the second polyvinyl alcohol film may be deformed to create multiple cavities, wherein each cavity may be the same or wherein the multiple cavities may comprise a selection of different shaped cavities. The liquid solvent sealing solution may be sprayed on the non-deformed portions of the second polyvinylalcohol film, on the deformed portions of the second polyvinylalcohol film or on both non-deformed and deformed portions of the second polyvinylalcohol film.

If the detergent composition is a powder detergent composition, there may be an additional step of removing excess/spilt powder from the non-deformed areas prior to application of the liquid solvent sealing composition. Those skilled in the art will be aware of known methods/techniques, such as vacuum, in order to achieve this.

The second polyvinyl alcohol film may be deformed on a drum or a horizontal belt.

Preferably, the process according to any preceding claims comprises the further steps of;
  c. applying the liquid sealing solvent composition onto at least a part of the second side of the first water-soluble polyvinylalcohol film or at least a part of the second side of the second water-soluble polyvinylalcohol film, preferably at least a part of the second side of the first water-soluble film, wherein, the liquid sealing solvent composition is applied as a spray from a nozzle, wherein the spray is defined according to the present invention;
  d. contacting at least a part of a first side of a third water-soluble polyvinylalcohol film with the part of the second side of the first water-soluble polyvinylalcohol film or second side of the second water-soluble polyvinylalcohol film, preferably second side of the first water-soluble film, which was sprayed with the liquid sealing solvent composition.

Preferably, prior to contacting the third polyvinylalcohol film with the first polyvinylalcohol film, the third polyvinylalcohol film is first deformed into an open cavity. This may be achieved, for example, via thermoforming, vacuum forming, or a combination thereof. Preferably, the open cavity is then filled with a detergent composition. The detergent composition is described in more detail below. The third polyvinylalcohol film is then contacted with the second side of the first water-soluble polyvinylalcohol film or second side of the second water-soluble film, preferably, the second side of the first water-soluble film.

Without wishing to be bound by theory, the entire area of the second side of the first water-soluble film or second side of the second eater-soluble film that was sprayed with the liquid solvent sealing composition may be contacted to at least a part of the first side of the third polyvinylalcohol film. Alternatively, a part of the area of the second side of the first water-soluble film, or the second side of the second water-soluble film that was sprayed with the liquid solvent sealing composition may be contacted to at least a part of the first side of the third polyvinylalcohol film.

When contacting the first side of the third polyinvylalcohol film and the second side of the second polyvinylalcohol film or second side of the first polyvinylalcohol film, pressure may be applied. Alternatively, heat may be applied. Alternatively, pressure and heat may be applied.

The third polyvinylalcohol film may be deformed to create a single open cavity. Alternatively, the third polyvinyl alcohol film may be deformed to create multiple cavities, wherein each cavity may be the same or wherein the multiple cavities may comprise a selection of different shaped cavities. The liquid solvent sealing solution may be sprayed on the non-deformed portions of the third polyvinylalcohol film, on the deformed portions of the third polyvinylalcohol film or on both non-deformed and deformed portions of the third polyvinylalcohol film.

If the detergent composition is a powder detergent composition, there may be an additional step of removing excess/spilt powder from the non-deformed areas prior to application of the liquid solvent sealing composition. Those skilled in the art will be aware of known methods/techniques, such as vacuum, in order to achieve this.

Preferably, the second water soluble film is deformed on a drum and the third water soluble film is deformed on a horizontal belt.

When three polyvinylalcohol films are used, the resultant unit dose article is a superposed unit dose article, in which at least a first compartment is situated on top of at least a second compartment, and in which the first and second compartments are separated by a layer of film.

Alternatively, the liquid solvent sealing composition may be sprayed onto the first side of the first polyvinylalcohol film and to the first side of the second polyvinylalcohol film, or solely to the first side of the second water-soluble film, prior to contacting the first polyvinylalcohol film and the second polyvinylalcohol film. The liquid solvent sealing composition may be sprayed onto the second side of the first polyvinylalcohol film and to the first side of the third polyvinylalcohol film, or solely to the first side of the third water-soluble film, prior to contacting the first polyvinylalcohol film and the third polyvinylalcohol film.

The third water-soluble film may first be deformed into an open cavity and the open cavity filled with a detergent composition, then contacted with the second side of the first water-soluble polyvinylalcohol film or second side of the second water-soluble polyvinylalcohol film. The third polyvinyl alcohol film may be deformed on a drum or a horizontal belt.

In a further aspect of the present invention, a fourth polyvinylalcohol film may be used. In such an execution, two separate water-soluble unit dose articles, each comprising a first polyvinylalcohol film and a second polyvinylalcohol film, made according to the present invention maybe be superposed one on top of the other and sealed together following the teaching of the present invention.

Film

The water-soluble films of the present invention is soluble or dispersible in water. The water-soluble film preferably has a thickness of from 20 to 150 micron, preferably 35 to 125 micron, even more preferably 50 to 110 micron, most preferably about 76 micron. By 'film' or 'films', we refer to independently the first polvinylalcohol film, the second polyvinylalcohol film, the third polyvinylalcohol film if present, or a combination thereof.

Preferably, the film has a water-solubility of at least 50%, preferably at least 75% or even at least 95%, as measured by the method set out here after using a glass-filter with a maximum pore size of 20 microns: 5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C.

Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

The water-soluble film material may be obtained by casting, blow-moulding, extrusion or blown extrusion of the polymeric material, as known in the art. The water-soluble film comprises polyvinylalcohol. The polyvinylalcohol may be present between 50% and 95%, preferably between 55% and 90%, more preferably between 60% and 80% by weight of the water-soluble film. The polyvinylalcohol preferably comprises polyvinyl alcohol homopolymer, polyvinylalcohol copolymer preferably anionic polyvinylalcohol copolymer, or a mixture thereof. Preferably, the water-soluble film comprises a polyvinylalcohol comprising or even consisting of a blend of polyvinylalcohol homopolymers and/or anionic polyvinylalcohol copolymers wherein the anionic polyvinyl alcohol copolymers preferably are selected from sulphonated and carboxylated anionic polyvinylalcohol copolymers especially carboxylated anionic polyvinylalcohol copolymers, most preferably the polyvinylalcohol comprises or even consists of a blend of two polyvinyl alcohol homopolymers or a blend of a polyvinylalcohol homopolymer and a carboxylated anionic polyvinylalcohol copolymer. Alternatively, the polyvinylalcohol comprises or even consists of a single anionic polyvinyl alcohol copolymer, most preferably a carboxylated anionic polyvinylalcohol copolymer. When the polyvinylalcohol in the water soluble film is a blend of a polyvinylalcohol homopolymer and a carboxylated anionic polyvinylalcohol copolymer, the homopolymer and the anionic copolymer preferably are present in a relative weight ratio of 90/10 to 10/90, preferably 80/20 to 20/80, more preferably 70/30 to 50/50. When the polyvinylalcohol in the water soluble film is a blend of two polyvinylalcohol homopolymers, then the first and the second polyvinylalcohol homopolymer preferably are present in a relative weight ratio of 90/10 to 10/90, preferably 80/20 to 20/80, more preferably 70/30 to 50/50. Without wishing to be bound by theory, the term "homopolymer" generally includes polymers having a single type of monomeric repeating unit (e.g., a polymeric chain comprising or consisting of a single monomeric repeating unit). For the particular case of polyvinylalcohol, the term "homopolymer" further includes copolymers having a distribution of vinyl alcohol monomer units and optionally vinyl acetate monomer units, depending on the degree of hydrolysis (e.g., a polymeric chain comprising or consisting of vinyl alcohol and vinyl acetate monomer units). In the case of 100% hydrolysis, a polyvinylalcohol homopolymer can include only vinyl alcohol units. Without wishing to be bound by theory, the term "copolymer" generally includes polymers having two or more types of monomeric repeating units (e.g., a polymeric chain comprising or consisting of two or more different monomeric repeating units, whether as random copolymers, block copolymers, etc.). For the particular case of polyvinylalcohol, the term "copolymer" (or "polyvinylalcohol copolymer") further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain comprising or consisting of vinyl alcohol monomer units, vinyl acetate monomer units, and one or more other monomer units, for example anionic monomer units). In the case of 100% hydrolysis, a polyvinylalcohol copolymer can include a copolymer having vinyl alcohol units and one or more other monomer units, but no vinyl acetate units. Without wishing to be bound by theory, the term "anionic copolymer" includes copolymers having an anionic monomer unit comprising an anionic moiety. General classes of anionic monomer units which can be used for the anionic polyvinyl alcohol co-polymer include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). The anionic monomer may be one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. Preferably, the anionic moiety of the first anionic monomer unit is selected from a sulphonate, a carboxylate, or a mixture thereof, more preferably a carboxylate, most preferably an acrylate, a methacrylate, a maleate, or a mixture thereof. Preferably, the anionic monomer unit is present in the anionic polyvinyl alcohol copolymer in an average amount in a range of between 1 mol. % and 10 mol. %, preferably between 2 mol. % and 5 mol. %. Preferably, the polyvinyl alcohol, and/or in case of polyvinylalcohol blends the individual polyvinylalcohol polymers, have an average viscosity (µl) in a range of between 4 mPa·s and 30 mPa·s, preferably between 5 mPa·s and 25 mPa·s, measured as a 4% polyvinyl alcohol copolymer solution in demineralized water at 20 degrees C. The viscosity of a polyvinyl alcohol polymer is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. It is well known in the art that the viscosity of an aqueous water-soluble polymer solution (polyvinylalcohol or otherwise) is correlated with the weight-average molecular weight of the same polymer, and often the viscosity is used as a proxy for weight-average molecular weight. Thus, the weight-average molecular weight of the polyvinylalcohol can be in a range of 20,000 to 175,000, or 25,000 to 100,000, or 30,000 to 80,000. Preferably, the polyvinyl alcohol, and/or in case of polyvinylalcohol blends the individual polyvinylalcohol polymers, have an average degree of hydrolysis in a range of between 75% and 99%, preferably between 80% and 95%, most preferably between 85% and 95%. A suitable test method to measure the degree of hydrolysis is as according to standard method JIS K6726.

Preferably, the water-soluble film comprises a non-aqueous plasticizer. Preferably, the non-aqueous plasticizer is selected from polyols, sugar alcohols, and mixtures thereof. Suitable polyols include polyols selected from the group consisting of glycerol, diglycerin, ethylene glycol, diethylene glycol, triethyleneglycol, tetraethylene glycol, polyethylene glycols up to 400 molecular weight, neopentyl glycol, 1,2-propylene glycol, 1,3-propanediol, dipropylene glycol, polypropylene glycol, 2-methyl-1,3-propanediol, trimethyl-olpropane and polyether polyols, or a mixture thereof. Suitable sugar alcohols include sugar alcohols selected from the group consisting of isomalt, maltitol, sorbitol, xylitol, erythritol, adonitol, dulcitol, pentaerythritol and mannitol, or a mixture thereof. More preferably the non-aqueous plasticizer is selected from glycerol, 1,2-propanediol, dipropylene glycol, 2-methyl-1,3-propanediol, trimethylolpropane, triethyleneglycol, polyethyleneglycol, sorbitol, or a mixture thereof, most preferably selected from glycerol, sorbitol, trimethylolpropane, dipropylene glycol, and mixtures thereof. One particularly suitable plasticizer system includes a blend of glycerol, sorbitol and trimethylol propane. Another particularly suitable plasticizer system includes a blend of glycerin, dipropylene glycol, and sorbitol. Preferably, the film comprises between 5% and 50%, preferably between 10% and 40%, more preferably between 20% and 30% by weight of the film of the non-aqueous plasticizer.

Preferably, the water-soluble film comprises a surfactant. Preferably, the water-soluble film comprises a surfactant in an amount between 0.1% and 2.5%, preferably between 1% and 2% by weight of the water-soluble film. Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

Preferably the water-soluble film according to the invention comprises lubricants/release agents. Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. The amount of lubricant/release agent in the water-soluble film is in a range of from 0.02% to 1.5%, preferably from 0.1% to 1% by weight of the water-soluble film.

Preferably, the water-soluble film comprises fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. Preferably, the amount of filler, extender, antiblocking agent, detackifying agent or mixture thereof in the water-soluble film is in a range of from 0.1% to 25%, preferably from 1% to 10%, more preferably from 2% to 8%, most preferably from 3% to 5% by weight of the water-soluble film. In the absence of starch, one preferred range for a suitable filler, extender, antiblocking agent, detackifying agent or mixture thereof is from 0.1% to 1%, preferably 4%, more preferably 6%, even more preferably from 1% to 4%, most preferably from 1% to 2.5%, by weight of the water-soluble film.

Preferably the water-soluble film according to the invention has a residual moisture content of at least 4%, more preferably in a range of from 4% to 15%, even more preferably of from 5% to 10% by weight of the water-soluble film as measured by Karl Fischer titration.

Preferred films exhibit good dissolution in cold water, meaning unheated distilled water. Preferably such films exhibit good dissolution at temperatures of 24° C., even more preferably at 10° C. By good dissolution it is meant that the film exhibits water-solubility of at least 50%, preferably at least 75% or even at least 95%, as measured by the method set out here after using a glass-filter with a maximum pore size of 20 microns, described above.

Water soluble films described herein are commercially supplied by MonoSol, LLC under the trade references M8630, M8900, M8779, M8310, by Aicello Corporation under the Solublon tradename, by Nippon Gohsei under the Hi-Selon tradename, or by Sekisui Chemical under the Selvol tradename.

The film may be opaque, transparent or translucent. The film may comprise a printed area. The area of print may be achieved using standard techniques, such as flexographic printing or inkjet printing. Preferably, the ink used in the printed area comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within the ink formulations.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

Preferably, the water-soluble film or water-soluble unit dose article or both are coated in a lubricating agent, preferably, wherein the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

Preferably, the water-soluble film, and each individual component thereof, independently comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within water-soluble films and ingredients thereof.

Nozzle

The nozzle is preferably selected from a hydraulic nozzle or an air atomised nozzle, preferably a hydraulic nozzle. When the process comprises multiple nozzles, each nozzle is preferably independently selected from a hydraulic nozzle or an air atomised nozzle, preferably a hydraulic nozzle.

Without wishing to be bound by theory, hydraulic nozzles use the internal energy of the liquid to break it apart into droplets and form a spray pattern. This is achieved by the sudden change of pressure and velocity within the nozzle.

Examples of hydraulic nozzles include solenoid nozzles where the liquid break up is adjuvated by a vibrating plunger that controls the spray pattern formation.

Without wishing to be bound by theory, air atomizing nozzles use compressed air, which impinged onto the liquid break it to form a spray pattern. The Droplet size with Air atomization nozzles is almost entirely provided by the energy of the compressed air (pressure and flow rate). Without wishing to be bound by theory, Air Atomizing nozzles with higher air pressure and flow rate to lead to smaller droplets at a given flow rate and liquid pressure. This means that even very low flow rates at low liquid pressures can be finely atomized.

Solvent Sealing Composition

Preferably, the liquid sealing solvent composition comprises water, non-aqueous solvent, or a mixture thereof. The sealing solvent composition may comprise further adjunct materials including, but not limited to, surfactants and or water-soluble polymers such as polyvinyl alcohol homopolymers and/or polyvinyl alcohol copolymers. Preferably, the liquid sealing solvent composition comprises at least 90%, more preferably at least 95% by weight of the liquid sealing solvent composition of water. Most preferably the liquid sealing solvent composition consists of water. The water may be demineralized water or may comprise water hardness ions and other ions typically found in commune waters. The liquid sealing solution may be at a temperature, before being sprayed out of the outlet orifice, of between 15° C. and 25° C.

Non-aqueous solvents may comprise propylene glycol, glycerol, 1,2-propanediol, dipropylene glycol, 2-methyl-1,3-propanediol, trimethylolpropane, triethyleneglycol, polyethyleneglycol, sorbitol, or a mixture thereof.

The liquid sealing solution may comprise polymers as adjunct ingredients. Preferably said adjunct polymers are the same polymers as comprised in the water-soluble film.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

EXAMPLES

Test Methods

Spray Pattern Geometry Quantification

The spray pattern and volume of liquid solvent sealing composition sprayed from an outlet orifice over a period of time can be determined using a Patternator, such as provided by SpotOn Mini Patternator.

Without wishing to be bound by theory, the Patternator is a box divided into vertical compartments where the water droplets will be separately collected in each bin upon the spray being applied to them from the outlet orifice. The height of the water collected in the bin after a pre-determined period of time, quantifies the spray pattern shape, and will also provide the overall volume of liquid solvent sealing solution sprayed within said pre-determined period of time.

Spray Angle

Figure 5:
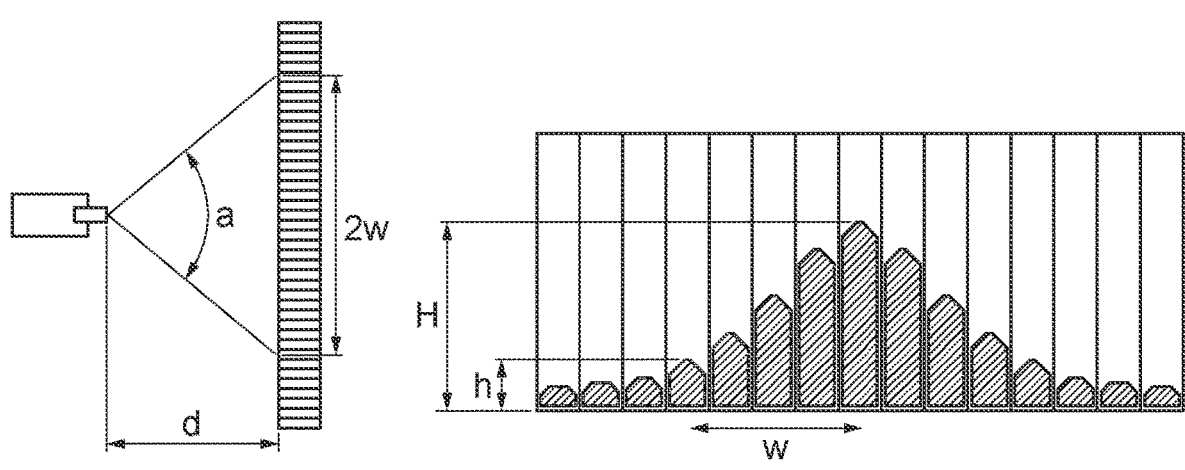
FIG. 5., depicts how to measure spray angle of a sprayed liquid solvent sealing composition using a Patternator apparatus.

With reference to FIG. 5., in order to determine the spray angle "a", the outlet orifice is placed at a distance d=100 mm from the Patternator described above. After spraying for a sufficient amount of time to allow for the water to fill the center bin it is defined as the spray pattern width w, the distance from the center bin with height "H" to the furthest bin of height "h" that most closely satisfies the conditions h=0.05*H. The Spray angle a is calculated as;

$$2*\arctan(w/d).$$

Droplet Size Test Method

The droplet size distribution was assessed using a Visi-Size P15 (Oxford Lasers ltd.). The liquid solvent sealing composition was spayed vertically downward from the outlet orifice of the nozzle.

The Spray droplet size distribution was assessed with a flow of 75 ml/min and pressure of 3 bar at a distance of 100 mm from the geometric centre of the outlet orifice of the nozzle.

Software used was VisiSize 6.5.42 and a B1921 Camera, Standard Lens Option 3×, Magnification Setting 4× was used.

Example 1

A nozzle comprising an outlet orifice having an orifice diameter of 0.38 mm and a spray angle of 100° (Spraying systems nozzle part no. AA10000AUH-104215-V1, with nozzle tip part no. TPU950033PWMD-SS) was placed vertically over a spray pattern test paper available from Gempler's (Janesville, WI, USA) as SpotOn® Spray Pattern Test paper placed at a distance of 80 mm perpendicularly below the outlet orifice. A liquid solvent sealing composition consisting of water was prepared.

Water at a temperature of 20° C. was sprayed from the outlet orifice at a pressure of 3.8 bar which resulted in a flow rate of 46.7 g/min. The room environment conditions were 23±2° C. and 35±5% rH.

The resulting spray pattern [flat cone] had a droplet size distribution with a diameter d50 of between 50 μm and 60 μm.

Under these conditions, a good spray efficiency of 75% was obtained. This efficiency is calculated by dividing the weight of liquid solvent sealing composition absorbed by the substrate in a defined time (in this case 30 s), by the actual weight of liquid solvent sealing composition sprayed (measured with a mass flow meter).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for sealing a first water-soluble polyvinylalcohol film to a second water-soluble polyvinylalcohol film, wherein the first water-soluble polyvinylalcohol film has a first side and a second side, and wherein the second water-soluble polyvinylalcohol film has a first side and a second side, wherein the process comprises the steps of:

a. applying a liquid solvent sealing composition onto at least a part of the first side of the first water-soluble polyvinylalcohol film;

b. contacting at least a part of the first side of the second water-soluble polyvinylalcohol film with at least a part of the first side of the first water-soluble polyvinylalcohol film which was sprayed with the liquid solvent sealing composition;

c. applying the liquid sealing solvent composition onto at least a part of the second side of the first water-soluble polyvinylalcohol film or at least a part of the second side of the second water-soluble polyvinylalcohol film, wherein, the liquid sealing solvent composition is applied as a spray from a nozzle;

d. contacting at least a part of a first side of a third water-soluble polyvinylalcohol film with the part of the second side of the first water-soluble polyvinylalcohol film or second side of the second water-soluble polyvinylalcohol film, which was sprayed with the liquid sealing solvent composition;

wherein the liquid solvent sealing composition is applied as a spray from a nozzle, wherein the nozzle comprises an outlet orifice and wherein the liquid solvent sealing composition is ejected from the outlet orifice;

wherein the shortest distance from the outlet orifice to the first side of the first water-soluble polyvinylalcohol film is between about 40 mm and about 160 mm;

wherein the spray has an average droplet size d50 of between about 50 microns and about 200 microns before it contacts the first side of the first water-soluble polyvinylalcohol film, wherein the average droplet size d50 is measured via optical imaging of spray droplets after being sprayed from the nozzle, wherein the spray droplets being measured are at a distance of about 100 mm perpendicular to the outlet orifice, and wherein the nozzle is orientated such that the spray exits the outlet orifice vertically and the image is captured perpendicular to the direction of movement of the droplets once they exit the outlet orifice using the Droplet Size Test Method described herein.

2. The process according to claim 1, wherein the nozzle is selected from a hydraulic nozzle or an air atomised nozzle.

3. The process according to claim 1, wherein the liquid solvent sealing composition is ejected from the outlet orifice at a pressure between about 200 kPa to about 1000 kPa.

4. The process according to claim 1, wherein the average droplet size d50 is between about 50 micron and about 150 micron, using the Droplet Size Test Method described herein.

5. The process according to claim 1, wherein at least about 50% of the droplets have a droplet size between about 50 microns and about 200 microns using the Droplet Size Test Method described herein.

6. The process according to claim 1, wherein the spray has a cone shape.

7. The process according to claim 6, wherein the cone shape is selected from elliptical cone, round cone, flat cone, or a mixture thereof.

8. The process according to claim 1, wherein the liquid solvent sealing composition is applied as a spray from a plurality of nozzles, wherein the plurality of nozzles comprises at least two nozzles, and wherein each nozzle comprises an outlet orifice and wherein the liquid composition is ejected from each outlet orifice; and wherein the spray from each nozzle outlet independently has an average droplet size d50 of between about 50 micron and about 200 micron, wherein the average droplet size d50 is measured via optical imaging of spray droplets after being sprayed from the nozzle, wherein the spray droplets being measured are at a distance of about 100 mm perpendicular to the outlet orifice using the Droplet Size Test Method described herein, and wherein the nozzle is orientated such that the spray exits the outlet orifice vertically and the image is captured perpendicular to the direction of movement of the droplets once they exit the outlet orifice.

9. The process according to claim 8, wherein the first polyvinylalcohol film moves in a machine direction and the plurality of nozzles are arranged side-by-side to one another in a cross-machine direction.

10. The process according to claim 8, wherein each nozzle independently has a spray angle and wherein when, independently, the spray from each nozzle is sprayed onto the first side of the first polyvinylalcohol film, the spray angle has a spray angle of between about 80 degrees and about 130 degrees, and the distance between the centre point of the outlet orifice of a nozzle to the centre point of the outlet orifice of an adjacent nozzle is between about 130 mm and about 250 mm.

11. The process according to claim 8, wherein the liquid sealing solvent composition is ejected from the plurality of nozzles simultaneously.

12. The process according to claim 1, wherein the first water-soluble polyvinyl alcohol film is coated with the liquid sealing solvent composition at a rate of between about 10 g/m$^2$ and about 40 g/m$^2$.

13. The process according to claim 1, wherein the liquid composition is ejected from the outlet orifice continually, or wherein the liquid composition is ejected from the outlet orifice intermittently.

14. The process according to claim 13, wherein the liquid composition is ejected from the outlet orifice intermittently, wherein the first polyvinylalcohol film is continuously moving in a machine direction, and wherein the first polyvinylalcohol film moves a distance in said machine direction of between about 0.5 mm and about 10 mm between each intermittent spray.

15. The process according to claim 1, wherein the liquid sealing solvent composition comprises water, non-aqueous solvent, or a mixture thereof.

16. The process according to claim 1, wherein the second water-soluble film is first deformed into an open cavity and the open cavity is filled with a detergent composition, then contacted with the first side of the first water-soluble polyvinylalcohol film.

17. The process according to claim 1, wherein the third water-soluble film is first deformed into an open cavity and the open cavity is filled with a detergent composition, then contacted with the second side of the first water-soluble polyvinylalcohol film or second side of the second water-soluble polyvinylalcohol film.

18. The process according to claim 1, wherein the first water-soluble polyvinylalcohol film, the second water-soluble polyvinylalcohol film, and the third water-soluble polyvinylalcohol film, are each independently selected from water-soluble films comprising polyvinyl alcohol homopolymer, polyvinyl alcohol copolymer, or a blend thereof.

\* \* \* \* \*